United States Patent
Deng et al.

(10) Patent No.: US 8,918,352 B2
(45) Date of Patent: Dec. 23, 2014

(54) LEARNING PROCESSES FOR SINGLE HIDDEN LAYER NEURAL NETWORKS WITH LINEAR OUTPUT UNITS

(75) Inventors: Li Deng, Redmond, WA (US); Dong Yu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 13/113,100

(22) Filed: May 23, 2011

(65) Prior Publication Data

US 2012/0303565 A1    Nov. 29, 2012

(51) Int. Cl.
  *G06F 15/18*    (2006.01)
  *G06N 3/08*    (2006.01)
  *G06N 99/00*    (2010.01)
  *G05B 13/02*    (2006.01)

(52) U.S. Cl.
  CPC .............. *G06N 3/08* (2013.01); *G06N 99/005* (2013.01); *G05B 13/027* (2013.01); *G06T 2207/20084* (2013.01)
  USPC ........................................... 706/25; 382/157

(58) Field of Classification Search
  CPC ..... G06N 3/08; G06N 99/005; G05B 13/027; G06T 2207/20084
  USPC ........................................... 706/25; 382/157
  See application file for complete search history.

(56) References Cited

U.S. PATENT DOCUMENTS

| | | | |
|---|---|---|---|
| 5,050,095 A | | 9/1991 | Samad |
| 5,345,539 A | * | 9/1994 | Webb ............................. 706/24 |
| 5,576,632 A | * | 11/1996 | Petsche et al. ........... 324/765.01 |
| 6,745,169 B1 | | 6/2004 | Schlang et al. |
| 7,734,555 B2 | * | 6/2010 | Lee et al. ........................ 706/25 |
| 2003/0190603 A1 | * | 10/2003 | Larder et al. ...................... 435/5 |
| 2003/0220889 A1 | | 11/2003 | Shi et al. |
| 2008/0208778 A1 | * | 8/2008 | Sayyar-Rodsari et al. ..... 706/12 |
| 2010/0293165 A1 | | 11/2010 | Eldering et al. |

OTHER PUBLICATIONS

Aizenberg, Igor, and Claudio Moraga. "Multilayer feedforward neural network based on multi-valued neurons (MLMVN) and a backpropagation learning algorithm." Soft Computing 11.2 (2007): 169-183.*

Khan, M. Kashif Saeed, and Wasfi G. Al-Khatib. "Machine-learning based classification of speech and music." Multimedia Systems 12.1 (2006): 55-67.*

Zhang, Jie, and A. J. Morris. "A sequential learning approach for single hidden layer neural networks." Neural networks 11.1 (1998): 65-80.*

(Continued)

*Primary Examiner* — Jeffrey A Gaffin
*Assistant Examiner* — James F Sugent
(74) *Attorney, Agent, or Firm* — Sandy Swain; David Andrews; Micky Minhas

(57) ABSTRACT

Learning processes for a single hidden layer neural network, including linear input units, nonlinear hidden units, and linear output units, calculate the lower-layer network parameter gradients by taking into consideration a solution for the upper-layer network parameters. The upper-layer network parameters are calculated by a closed form formula given the lower-layer network parameters. An accelerated gradient algorithm can be used to update the lower-layer network parameters. A weighted gradient also can be used. With the combination of these techniques, accelerated training with faster convergence, to a point with a lower error rate, can be obtained.

20 Claims, 5 Drawing Sheets

(56) References Cited

OTHER PUBLICATIONS

Park, Dong C., Mohamed A. Ei-Sharkawi, and Robert J. Marks. "An adaptively trained neural network." Neural Networks, IEEE Transactions on 2.3 (1991): 334-345.*
Bishop, Christopher M. "Curvature-driven smoothing: a learning algorithm for feedforward networks." Neural Networks, IEEE Transactions on 4.5 (1993): 882-884.*
Kim, Taehwan, and Tulay Adali. "Fully complex backpropagation for constant envelope signal processing." Neural Networks for Signal Processing X, 2000. Proceedings of the 2000 IEEE Signal Processing Society Workshop. vol. 1. IEEE, 2000.*
Bhama, Satyendra, and Harpreet Singh. "Single layer neural networks for linear system identification using gradient descent technique." Neural Networks, IEEE Transactions on 4.5 (1993): 884-888.*
Yu, Chien-Cheng, and Bin-Da Liu. "A backpropagation algorithm with adaptive learning rate and momentum coefficient." Neural Networks, 2002. IJCNN'02. Proceedings of the 2002 International Joint Conference on. vol. 2. IEEE, 2002.*
Choi, Bumghi, Ju-Hong Lee, and Deok-Hwan Kim. "Solving local minima problem with large number of hidden nodes on two-layered feed-forward artificial neural networks." Neurocomputing 71.16 (2008): 3640-3643.*
Choi, Bumghi, Ju-Hong Lee, and Tae-Su Park. "Alternate learning algorithm on multilayer perceptrons." Computational Science—ICCS 2006. Springer Berlin Heidelberg, 2006. 63-67.*
Cai, Haibin, and Qiying Cao. "An improved BP algorithm based on the nonlinear least square method and application in congestion control." Intelligent Control and Automation, 2006. WCICA 2006. The Sixth World Congress on. vol. 1. IEEE, 2006.*
Chen, et al., "A rapid supervised learning neural network for function interpolation and approximation", Retrieved at <<http://ieeexplore.ieee.org/stamp/stamp.jsp?tp=&arnumber=536316>>, Proceedings of IEEE Transactions on Neural Networks, vol. 7 No. 5, Sep. 1996, pp. 1220-1230.
Peng, et al., "A New Jacobian Matrix for Optimal Learning of Single-Layer Neural Networks", Retrieved at <<http://ieeexplore.ieee.org/stamp/stamp.jsp?tp=&amumber=4359205>>, Proceedings of IEEE Transactions on Neural Networks, vol. 19 No. 1, Jan. 2008, pp. 119-129.
Meleiro, et al. "Constructive neural network in model-based control of a biotechnological process", Retrieved at <<http://ieeexplore.ieee.org/stamp/stamp.jsp?tp=&arnumber=1223789>>, Proceedings of the International Joint Conference on Neural Networks, vol. 3, Jul. 20-24, 2003, pp. 2406-2411.
Parlos, et al., "An accelerated learning algorithm for multilayer perceptron networks", Retrieved at <<http://ieeexplore.ieee.org/stamp/stamp.jsp?tp=&amumber=286921&userType=inst>>, Proceedings of IEEE Transactions on Neural Networks, vol. 5 No. 3, May 1994, pp. 493-497.
Parekh, et al., "Constructive neural-network learning algorithms for pattern classification", Retrieved at <<http://ieeexplore.ieee.org/stamp/stamp.jsp7tp=&amumber=839013>>, Proceedings of IEEE Transactions on Neural Networks, vol. 11 No. 2, Mar. 2000, pp. 436-447.
Huang, et al., "Extreme Learning Machine: Theory and Applications", Retrieved at <<http://203.113.60.200/boy/boycs/KE-Lecture/Extreme%20Learning%20Machine-%20Theory%20and%20Applications.pdf>>, 2006, pp. 489-501.
Zhu, et al., "Evolutionary Extreme Learning Machine", Retrieved at <<http://www.ntu.edu.sg/home/egbhuang/Evolutionary-ELM.pdf>>, Mar. 30, 2005, pp. 1759-1763.
Huang, et al., "Enhanced Random Search based Incremental Extreme Learning Machine", Retrieved at <<http://www.ntu.edu.sg/home/egbhuang/EI-ELM.pdf>>, vol. 71 No. 16-18, Oct. 2008, pp. 3460-3468.
Lecun, et al., "Gradient-based Learning Applied to Document Recognition", Retrieved at <<http://ieeexplore.ieee.org/stamp/starnp.jsp?tp=&arnumber=726791>>, Proceedings of the IEEE, vol. 86, No. 11, Nov. 1998, pp. 2278-2324.
Hinton, et al., "Reducing the Dimensionality of Data with Neural Networks", Retrieved at <<http://www.cs.toronto.edu/~hinton/science.pdf>>, vol. 313 No. 5786, Jul. 28, 2006, pp. 504-507.
Beck, et al., "Gradient-based Algorithms with Application to Signal Recovery Problems", Retrieved at http://www.math.tau.ac.il/~teboulle/papers/gradient_chapter.pdf>>, pp. 3-51.
Dahl, et al., "Context-dependent Pre-trained Deep Neural Networks for Large Vocabulary Speech Recognition", Retrieved at <<http://ieeexplore.ieee.org/stamp/stamp.jsp?tp=&arnumber=5740583>>, 2011, Proceedings of IEEE Transactions on Audio, Speech, and Language Processing, pp. 1-13.
Yu, et al., "Deep Learning and its Applications to Signal and Information Processing", Retrieved at <<http://research.microsoft.com/pubs/143620/DeepLearn-SPM2010.pdf>>, Proceedings of IEEE Signal Processing Magazine, vol. 28, No. 1, Jan. 2011, pp. 6.

\* cited by examiner

US 8,918,352 B2

LEARNING PROCESSES FOR SINGLE HIDDEN LAYER NEURAL NETWORKS WITH LINEAR OUTPUT UNITS

BACKGROUND

Single-hidden-layer neural networks (SHLNN) with least square error training are commonly used in data processing applications such as various types of pattern classification, including but not limited to image classification, text classification, handwriting recognition and speech recognition, due partly to their powerful modeling ability and partly due to the existence of efficient learning algorithms.

In a single hidden layer neural network, given the set of input vectors $X=[x_1, \ldots, x_i, \ldots, x_N]$, each vector is denoted by $x_i=[x_{1i}, \ldots, x_{ji}, \ldots, x_{Di}]^T$ where D is the dimension of the input vector and N is the total number of training samples. Also, L is the number of hidden units and C is the dimension of the output vector. The output of the SHLNN is $y_i=U^T h_i$, where $h_i=\sigma(W^T x_i)$ is the hidden layer output, U is an L×C weight matrix at the upper layer, W is an D×L weight matrix at the lower layer, and $\sigma(\cdot)$ is the sigmoid function. Bias terms are implicitly represented in the above formulation if $x_i$ and $h_i$ are augmented with 1's.

Given the target vectors $T=[t_1, \ldots, t_i, \ldots, t_N]$, where each target $t_i=[t_{1i}, \ldots, t_{ji}, \ldots, t_{Ci}]^T$, the parameters U and W are learned to minimize the square error $E=\|Y-T\|^2=Tr[(Y-T)(Y-T)^T]$, where $Y=[y_1, \ldots, y_i, \ldots, y_N]$. After the lower layer weights W are fixed, the hidden layer values $H=[h_1, \ldots, h_i, \ldots, h_N]$ are also determined uniquely. Subsequently, the upper layer weights U can be determined by setting the gradient $$\frac{\partial E}{\partial U} = \frac{\partial Tr[(U^T H - T)(U^T H - T)^T]}{\partial U} = 2H(U^T H - T)^T$$

to zero, leading to the closed-form solution: $U=(HH^T)^{-1}HT^T$, which defines an implicit constraint between the two sets of weights, U and W, via the hidden layer output H, in the SHLNN.

In some systems, achieving good classification accuracy involves utilizing a large number of hidden units, which increases the model size and the test time. Tradeoffs designed to reduce model size, often are not efficient in finding good model parameters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The training process for a single hidden layer neural network calculates the lower-layer network parameter gradients by taking into consideration a solution for the upper-layer network parameters. An accelerated gradient algorithm can be used to update the lower-layer network parameters. A weighted gradient also can be used. With the combination of these techniques, accelerated training with faster convergence, to a point with a lower error rate, can be obtained.

Accordingly, in various aspects the subject matter can be embodied in a computer-implemented process, an article of manufacture and/or a computing machine. Data defining a single hidden layer neural network is received into memory. During training, a gradient of a square error with respect to lower layer network parameters is computed using upper layer network parameters as a function of the lower layer network parameters. The network parameters are updated according to the computed gradient. In one implementation, the lower layer network parameters are updated using a gradient history. In another implementation, the gradient uses a weight for each sample, wherein the weights are positively correlated to errors introduced by each sample.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which an SHLNN can be implemented.

Figure 1:
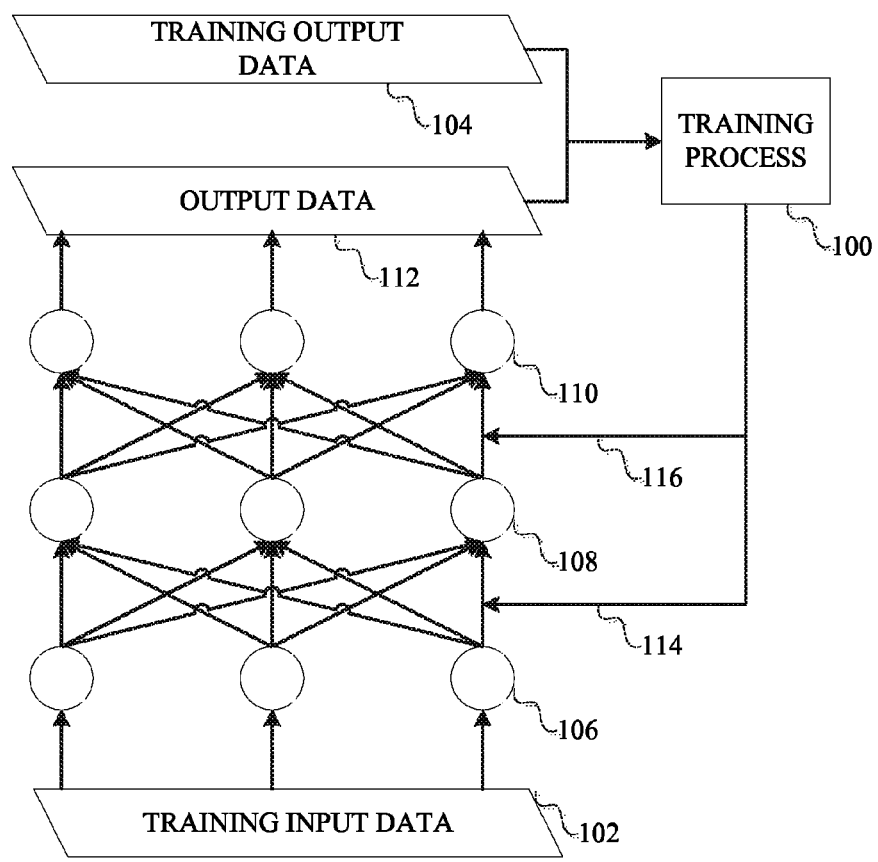
FIG. 1 is a block diagram of an example application environment in which the SHLNN can be used.

Referring to FIG. 1, a single hidden layer neural network (SHLNN) is trained by a training process 100. Input training data 102 is applied to the input layer 106 of an SHLNN and output data 112 is provided by the output layer 110. The output data 112 is compared to output training data 104 to obtain error data, and the training process 100 continually adjusts (as indicated by arrows 114 and 116) the weights between the input layer 106 and the hidden layer 108 and the weights between the hidden layer 108 and the output layer 110 to minimize the error.

Such training may be performed to create a pattern classification tool. For example, two dimensional images including handwriting from an input device can be used as the inputs to the input layer, and the output layer can provide outputs classifying images as a letter. As another example, audio data including speech from an input device can be used as the inputs to the input layer, and the output layer can provide outputs classifying the speech into letters, phonemes or other components of speech.

After a neural network is trained, actual data can be input to the input layer, and the output layer outputs would indicate how the input data is classified.

Given this context, example implementations of the training process will be described in more detail in connection with FIGS. 2-5.

Figure 2:
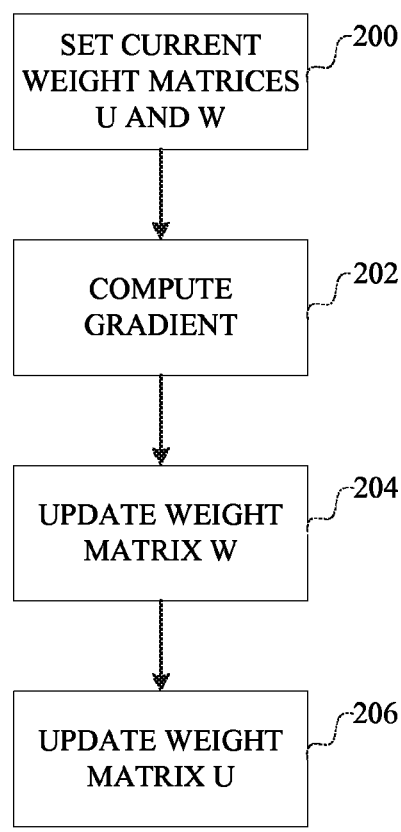
FIG. 2 is a flow chart describing an example implementation of the training process.

FIG. 2 illustrates an example implementation that is unaware of the upper-layer solution when calculating the gradient. In particular, given fixed current U (weight matrix of the upper layer) and W (weight matrix of the lower layer) as shown at 200, the following gradient is computed (202):

$$\frac{\partial E}{\partial W} = \frac{\partial Tr\left[(U^T \sigma(W^T X) - T)(U^T \sigma(W^T X) - T)^T\right]}{\partial W} \quad (1)$$

$$= 2X\left[H \circ (1-H) \circ (UU^T H - UT)^T\right]$$

where ∘ is element-wise product.

In this implementation, W is updated (204) first using the gradient defined directly as $$W_{k+1} = W_k - \rho \frac{\partial E}{\partial W'} \quad (2)$$

where ρ is the learning rate. Next, U is calculated (206) using the closed-form solution: $U=(HH^T)^{-1}HT^T$.

Figure 3:
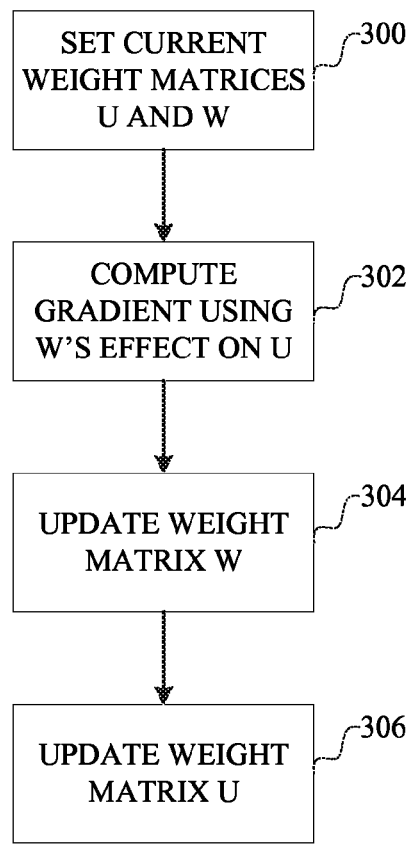
FIG. 3 is a flow chart describing another example implementation of the training process.

In another implementation, shown in FIG. 3, the training process relies on the fact that the upper layer weight matrix U completely depends on the lower layer weight matrix W. In this implementation, given fixed current U (weight matrix of the upper layer) and W (weight matrix of the lower layer) as shown at 300, the gradient ∂E/∂W is computed 302 by considering W's effect on the upper-layer weights U and thus the effect on the square error as the training objective function. By treating U a function of W, and substituting the closed form solution of $U=(HH^T)^{-1}HT^T$ into the equation for the squared error E, the gradient is defined as:

$$\frac{\partial E}{\partial W} = \frac{\partial Tr\left[(U^T H - T)(U^T H - T)^T\right]}{\partial W} \quad (3)$$

$$= \frac{\partial Tr\left[\left([(HH^T)^{-1}HT^T]^T H - T\right)\left([(HH^T)^{-1}HT^T]^T H - T\right)^T\right]}{\partial W}$$

$$= \frac{\partial Tr\left[TT^T - TH^T(HH^T)^{-1}HT^T\right]}{\partial W}$$

$$= \frac{-\partial Tr[HH^T)^{-1}HT^T TH^T]}{\partial W}$$

$$= \frac{-\partial Tr\left[(\sigma(W^T X)[\sigma(W^T X)]^T)^{-1} \sigma(W^T X) T^T T[\sigma(W^T X)]^T\right]}{\partial W}$$

$$= 2X[H^T \circ (1-H)^T \circ [H^\dagger (HT^T)(TH^\dagger) - T^T(TH^\dagger)]].$$

where $$H^\dagger = H^T (HH^T)^{-1} \quad (4)$$

is the pseudo-inverse of H. In the derivation of (3), $HH^T$ is symmetric and so is $(HH^T)^{-1}$. Also, $$\frac{\partial Tr\left[(HH^T)^{-1}HT^T TH^T\right]}{\partial H^T} = \quad (5)$$

$$-2H^T(HH^T)^{-1}HT^T TH^T(HH^T)^{-1} + 2T^T TH^T(HH^T)^{-1}.$$

Given this gradient, W is updated 304, then U is updated 306. In this implementation, because the effect of W on U is used, training tends to move W towards a direction that finds optimal points faster. However, due to the more complicated gradient calculation that involves a pseudo-inverse, each iteration takes a longer time than the iterations of the first implementation. The products of matrices are grouped in (3) to reduce memory usage when the number of samples is very large.

Figure 4:
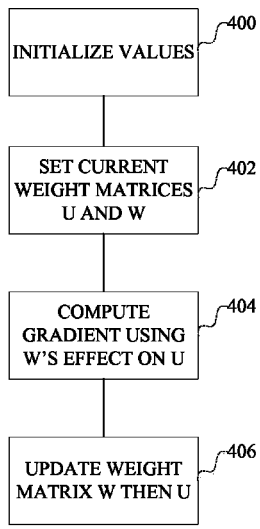
FIG. 4 is a flow chart describing another example implementation of the training process.
Figure 5:
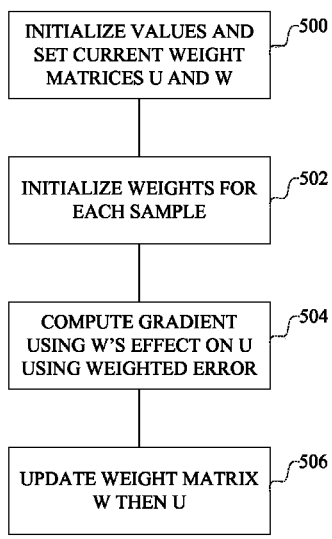
FIG. 5 is a flow chart describing another example implementation of the training process.

Another implementation, described now in connection with FIG. 4, relies on the principle that, for convex problems, convergence speed can be improved if gradient information over history is used when updating the weights. Although the increase in speed may not be guaranteed for non-convex problems, in practice, faster convergence, to a point where a lower error rate is achieved, has occurred. In particular, during initialization 400, the process sets $W_0$ and then sets $\overline{W}_1 = W_0$ and $m_1 = 1$. The current U and W are set and the gradient is computed as in the other implementations, as indicated at 402. Then W and U are updated (404, 406). When updating 404 the lower weight matrix, W, $\overline{W}$ and t are updated by:

$$W_k = \overline{W}_k - \rho \frac{\partial E}{\partial W'} \text{ and } m_{k+1} =$$

$$\frac{1}{2}\left(1 + \sqrt{1 + 4m_k^2}\right) \text{ and } \overline{W}_{k+1} = W_k + \frac{m_{k-1}}{m_{k+1}}(W_k - W_{k-1}).$$

In the foregoing implementations, each sample is weighted the same. The convergence speed can be increased by focusing on samples with the most errors, as described in connection with FIG. 5. This implementation makes use of a weight for each sample i, namely:

$$\lambda_{ii} = \left(\frac{N}{E}\|y_i - t_i\|^2 + 1\right)/2$$

where E is the square error over the whole training set and N is the training set size. The weights are so chosen that they are positively correlated to the errors introduced by each sample while being smoothed to make sure weights assigned to each sample is at least 0.5. Thus, after initializing values and W and U (500), these weights are initialized 502. At each step, instead of minimizing E directly, the weighted error is minimized (504):

$$\ddot{E} = Tr[(Y-T)\Lambda(Y-T)^T],$$

where $\Lambda = \text{diag}[\lambda_{11}, \ldots, \lambda_{ii}, \ldots, \lambda_{NN}]$ is an N by N diagonal weight matrix. To minimize Ë, once the lower layer weights W are fixed (506) the upper layer weights U can be determined (506) by setting the following gradient to zero:

$$\frac{\partial \ddot{E}}{\partial U} = \frac{\partial Tr[(Y-T)\Lambda(Y-T)^T]}{\partial U}$$

$$= 2H\Lambda(U^T H - T)^T$$

This gradient has the closed form solution of:

$$U = (H\Lambda H^T)^{-1} H\Lambda T^T$$

By substitution, the following is derived:

$$\frac{\partial \ddot{E}}{\partial W} = \frac{\partial Tr\left[(U^T H - T)\Lambda(U^T H - T)^T\right]}{\partial W}$$

$$= \frac{\partial Tr\left[\left([(H\Lambda H^T)^{-1} H\Lambda T^T]^T H - T\right)\Lambda\left([(H\Lambda H^T)^{-1} H\Lambda T^T]^T H - T\right)^T\right]}{\partial W}$$

$$= \frac{\partial Tr\left[T\Lambda T^T - T\Lambda H^T(H\Lambda H^T)^{-1} H\Lambda T^T\right]}{\partial W}$$

$$= \frac{-\partial Tr\left[(H\Lambda H^T)^{-1} H\Lambda T^T T\Lambda H^T\right]}{\partial W}$$

$$= 2X[H^T \circ (1-H)^T \circ [H^\ddagger (H\Lambda T^T)(TH^\ddagger) - \Lambda T^T(TH^\ddagger)]],$$

where $H^\ddagger = \Lambda H^T (H\Lambda H^T)^{-1}$

Because the weights are re-estimated after each iteration, this process will try to move the weights with a larger step toward the direction where the error can be most effectively reduced. After the error for a sample is reduced, the weight for that sample in the next iteration, which speeds up convergence and reduces the likelihood of local optima.

Having now described several example implementations, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
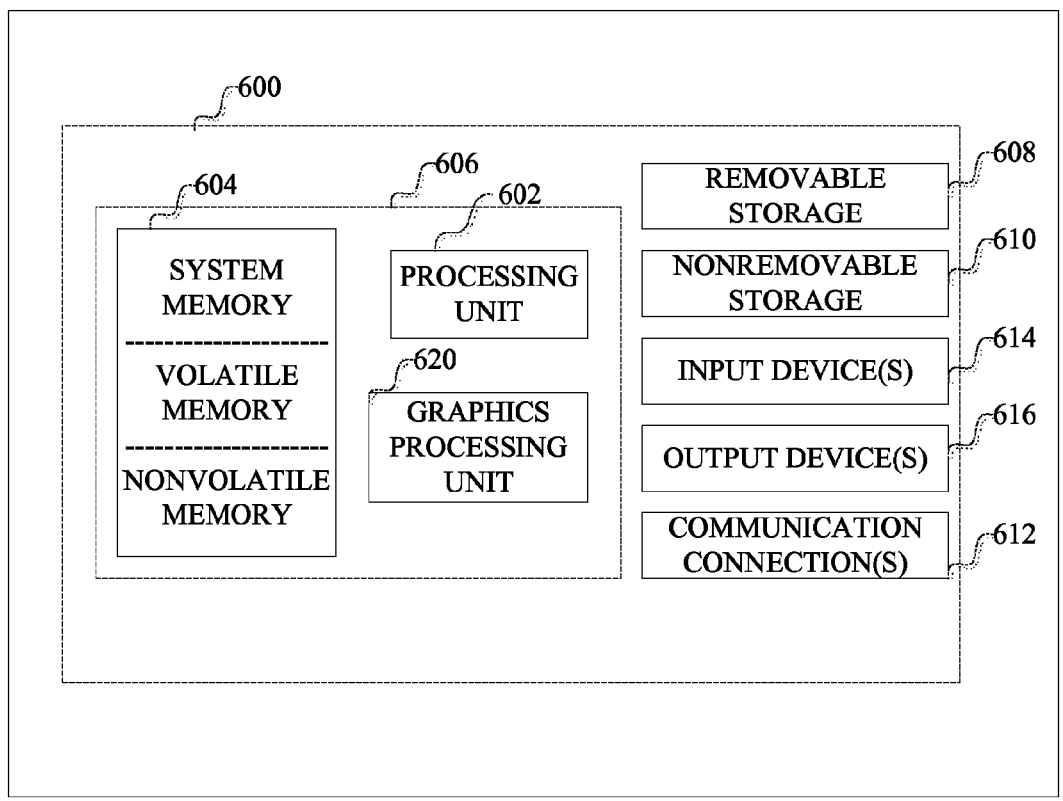
FIG. 6 is a block diagram of an example computing device in which such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606.

Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 600. Any such computer storage media may be part of computing machine 600.

Computing machine 600 may also contain communications connection(s) 612 that allow the device to communicate with other devices. Communications connection(s) 612 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 600 may have various input device(s) 614 such as a display, a keyboard, mouse, pen, camera, touch input device, and so on. Output device(s) 616 such as speakers, a printer, and so on may also be included. All of these devices are well known in the art and need not be discussed at length here.

The system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
receiving into memory data defining a single hidden layer neural network which includes a linear input layer, a nonlinear hidden layer, and a linear output layer, having lower layer weights applied to the input layer to provide an output of the hidden layer and upper layer weights applied to the output of the hidden layer to provide an output of the output layer;
computing a gradient of a square error with respect to the lower layer weights, wherein the gradient of the square error is a first function derived by a. specifying a second function defining the gradient of the square error using the lower layer weights and the upper layer weights, and b. substituting, in the second function, the upper layer weights with a third function defining the upper layer weights using the lower layer weights; and
within each learning stage, updating the lower layer weights according to the computed gradient using the first function and then updating the upper layer weights according to the third function defining the upper layer weights using the updated lower layer weights.

2. The computer-implemented process of claim 1, further comprising updating the lower layer weights using a gradient history.

3. The computer implemented process of claim 2, wherein computing the gradient uses a weight for each sample, wherein the weights are positively correlated to errors introduced by each sample.

4. The computer-implemented process of claim 1, further comprising:
applying input data to the input layer;
computing error data from output data from the output layer and desired output data corresponding to the input data.

5. The computer-implemented process of claim 4, wherein the input data is two dimensional images.

6. The computer-implemented process of claim 5, wherein the two-dimensional images include handwriting from an input device and the output layer provides outputs classifying the handwriting into text.

7. The computer-implemented process of claim 4, wherein the input data is audio data.

8. The computer-implemented process of claim 7, wherein the audio data includes speech and the output layer provides outputs classifying contents of the audio data into components of speech.

9. An article of manufacture comprising:
a computer storage medium;
computer program instructions stored on the computer storage medium which, when processed by a processing device, instruct the processing device to perform a process comprising:
receiving into memory data defining a single hidden layer neural network which includes a linear input layer, a nonlinear hidden layer, and a linear output layer, having lower layer weights applied to the input layer to provide an output of the hidden layer and upper layer weights applied to the output of the hidden layer to provide and output of the output layer;
computing a gradient of a square error with respect to the lower layer weights, wherein the gradient of the square error is a first function derived by a. specifying a second function defining the gradient of the square error using the lower layer weights and the upper layer weights, and b. substituting, in the second function, the upper layer weights with a third function defining the upper layer weights using the lower layer weights; and
within each learning stage, updating the lower layer weights according to the computed gradient using the first function and then updating the upper layer weights according to the third function defining the upper layer weights using the updated lower layer weights.

10. The article of manufacture of claim 9, wherein the process performed by the processing device further comprises updating the lower layer weights using a gradient history.

11. The article of manufacture of claim 10, wherein the gradient uses a weight for each sample, wherein the weights are positively correlated to errors introduced by each sample.

12. The article of manufacture of claim 9, wherein the process performed by the processing unit further comprises:
applying input data to the input layer; and
computing error data from output data from the output layer and desired output data corresponding to the input data.

13. The article of manufacture of claim 12, wherein the input data is two dimensional images, and the output layer provides outputs classifying contents of the images.

14. The article of manufacture of claim 12, wherein the input data is audio data including speech and the output layer provides outputs classifying contents of the audio data into components of speech.

15. A computing machine comprising:
a memory storing data defining a single hidden layer neural network which includes a linear layer, a nonlinear hidden layer, and a linear output layer, having lower layer weights applied to the input layer to provide an output of the hidden layer and upper layer weights applied to the output of the hidden layer to provide an output of the output layer;
a processing unit configured to compute a gradient of a square error with respect to the lower layer weights, wherein the gradient of the square error is a first function derived by a. specifying a second function defining the gradient of the square error using the lower layer weights and the upper layer weights, and b. substituting, in the second function, the upper layer weights with a third function defining the upper layer weights using the lower layer weights and, in each learning stage, to update the lower layer weights according to the computed gradient using the first function and then to update the upper layer weights according to the third function defining the upper layer weights using the updated lower layer weights.

16. The computing machine of claim 15, wherein the processing unit is further configured to update the lower layer weights using a gradient history.

17. The computing machine of claim 16, wherein the gradient uses a weight for each sample, wherein the weights are positively correlated to errors introduced by each sample.

18. The computing machine of claim 15, wherein the processing unit is further configured to:
apply input data to the input layer; and
compute error data from output data from the output layer and desired output data corresponding to the input data.

19. The computing machine of claim 18, wherein the input data is two dimensional images, and the output layer provides outputs classifying contents of the images.

20. The computing machine of claim 18, wherein the input data is audio data including speech and the output layer provides outputs classifying contents of the audio data into components of speech.

* * * * *